(12) United States Patent
Stamler et al.

(10) Patent No.: US 7,631,055 B1
(45) Date of Patent: Dec. 8, 2009

(54) METHOD AND APPARATUS PROVIDING AUTOMATIC CONNECTION ANNOUNCEMENT FROM A MODULAR NETWORK DEVICE TO A NETWORK MANAGEMENT POINT

(75) Inventors: Arnold Stamler, Sunnyvale, CA (US); Ikramullah Mohammad, Newark, CA (US)

(73) Assignee: Cisco Technology, Inc., San Jose, CA (US)

( * ) Notice: Subject to any disclaimer, the term of this patent is extended or adjusted under 35 U.S.C. 154(b) by 865 days.

(21) Appl. No.: 10/422,227

(22) Filed: Apr. 23, 2003

(51) Int. Cl.
G06F 15/177 (2006.01)
G06F 15/16 (2006.01)
(52) U.S. Cl. .................. 709/220; 709/222; 709/230
(58) Field of Classification Search ............... 709/230, 709/220, 221, 222
See application file for complete search history.

(56) References Cited

U.S. PATENT DOCUMENTS

| | | | |
|---|---|---|---|
| 5,050,070 A | 9/1991 | Chastain et al. | |
| 5,150,464 A | 9/1992 | Sidhu et al. | |
| 5,274,771 A | 12/1993 | Hamilton et al. | |
| 5,351,040 A | 9/1994 | Matsuura et al. | |
| 5,594,717 A | 1/1997 | Watanabe et al. | |
| 5,778,323 A | 7/1998 | Dorenbosch et al. | |
| 5,787,246 A * | 7/1998 | Lichtman et al. ............ | 709/220 |
| 5,948,077 A | 9/1999 | Choi et al. | |
| 5,999,975 A | 12/1999 | Kittaka et al. | |
| 6,240,165 B1 | 5/2001 | Yano et al. | |
| 6,243,747 B1 * | 6/2001 | Lewis et al. ................ | 709/220 |
| 6,363,423 B1 | 3/2002 | Chiles et al. | |
| 6,363,499 B1 | 3/2002 | Delo et al. | |
| 6,430,541 B1 | 8/2002 | Brown et al. | |
| 6,438,749 B1 | 8/2002 | Chamberlain | |
| 6,523,070 B1 | 2/2003 | Stapleton et al. | |

(Continued)

FOREIGN PATENT DOCUMENTS

WO    WO 99/41937 A1    8/1999

(Continued)

OTHER PUBLICATIONS

Cisco Systems, Inc., "Programmable Network Solutions, Business and Operational Challenges," White Paper, 1992-2002, pp. 1-7.

(Continued)

*Primary Examiner*—Larry D Donaghue
*Assistant Examiner*—Brian J Gillis
(74) *Attorney, Agent, or Firm*—Hickman Palermo Truong & Becker LLP

(57) ABSTRACT

A method of provisioning modular network devices is described. A generic configuration is placed on a device; the configuration comprises commands for configuring interfaces associated the device. At the device, each interface associated with the device is configured with at least one command associated with the configuration. The device then attempts to connect with a management point through the current interface. If the current interface can connect to the management point, then an inventory of all interfaces associated with the device is self-initiated and automatically communicated by the device to the management point. In other embodiments, based on the inventory information, a configuration template containing relative interface references may be resolved into a permanent device configuration that includes absolute interface references. As a result, modular network devices in which interfaces of various types are installed at different slot locations may acquire a permanent configuration automatically from a remote management station.

32 Claims, 8 Drawing Sheets

U.S. PATENT DOCUMENTS

| | | | |
|---|---|---|---|
| 6,546,425 | B1 | 4/2003 | Hanson et al. |
| 6,587,827 | B1 | 7/2003 | Hennig et al. |
| 6,647,510 | B1 | 11/2003 | Ganesh et al. |
| 6,654,726 | B1 | 11/2003 | Hanzek |
| 6,707,820 | B1 | 3/2004 | Arndt et al. |
| 6,714,972 | B1 | 3/2004 | Lee et al. |
| 6,725,033 | B2 | 4/2004 | Holmes |
| 6,769,074 | B2 | 7/2004 | Vaitzblit |
| 6,826,611 | B1 * | 11/2004 | Arndt .......................... 709/226 |
| 6,882,626 | B1 | 4/2005 | Marathe et al. |
| 6,907,602 | B2 | 6/2005 | Tsai et al. |
| 6,981,047 | B2 | 12/2005 | Hanson et al. |
| 7,017,155 | B2 | 3/2006 | Peev et al. |
| 7,136,645 | B2 | 11/2006 | Hanson et al. |
| 7,142,530 | B1 | 11/2006 | Chewning et al. |
| 7,155,497 | B2 * | 12/2006 | Grover et al. ............... 709/222 |
| 7,185,113 | B1 | 2/2007 | Haberman et al. |
| 7,221,675 | B2 | 5/2007 | Bryden et al. |
| 7,230,949 | B2 | 6/2007 | Bharali et al. |
| 7,243,160 | B2 | 7/2007 | Brahmaroutu |
| 2001/0056386 | A1 * | 12/2001 | O'Halloran et al. ........... 705/28 |
| 2002/0001307 | A1 | 1/2002 | Nguyen et al. |
| 2002/0040389 | A1 | 4/2002 | Gerba et al. |
| 2002/0133573 | A1 | 9/2002 | Matsuda et al. |
| 2002/0150108 | A1 | 10/2002 | Nattkemper et al. |
| 2003/0009752 | A1 | 1/2003 | Gupta |
| 2003/0061315 | A1 | 3/2003 | Jin |
| 2003/0061320 | A1 | 3/2003 | Grover et al. |
| 2003/0069960 | A1 * | 4/2003 | Symons et al. .............. 709/224 |
| 2003/0078999 | A1 | 4/2003 | Lund et al. |
| 2003/0108039 | A1 | 6/2003 | Shell et al. |
| 2003/0108051 | A1 | 6/2003 | Bryden et al. |
| 2003/0121033 | A1 * | 6/2003 | Peev et al. .................. 717/175 |
| 2004/0019665 | A1 * | 1/2004 | Liang et al. ................. 709/221 |
| 2005/0193103 | A1 | 9/2005 | Drabik |

FOREIGN PATENT DOCUMENTS

WO     WO 2006/010952 A2     2/2006

OTHER PUBLICATIONS

Cisco Systems, Inc., "Sigma and Cisco Systems Service Fulfillment Offering for Advanced IP Services," 1992-2001, pp. 1-6.

Cisco Systems, Inc., "Simple Network-Enabled Auto-Provisioning for Cisco IAD2420 Series IADs," undated, pp. 1-26.

Nortel Networks, "Passport 6400 Express Manager," Product Brief, 2000, pp. 1-4.

Netility Corporation, "Products and Technology Overview," http://www.netility.com/pasover.html, printed Sep. 2, 2003, pp. 1-2.

Netility Corporation, "3400 Business Gateway Product Overview," http://www.netility.com/3400_overview.html, printed Sep. 2, 2003, pp. 1-4.

Netility Corporation, "Netility Announces First Auto-Configuring G.SHDSL CPE," Dec. 11, 2001, http://www.netility.com/3400_pr.html, printed Sep. 2, 2003, pp. 1-2.

Netility Corporation, "Frequently Asked Questions," http://www.netility.com/faq.html, printed Sep. 2, 2003, pp. 1-3.

Netility Corporation, "Products/Solutions Overview," http://www.netility.com/3100—overview.html, printed Sep. 2, 2003, pp. 1-2.

Netility Corporation, "3100 Product Overview," undated, 3 pages.

Netility Corporation, "Network Access Device User's Guide, Model 3100," Jun. 5, 2001, pp. 1-64.

Netility Corporation, "Netility Redefines SDSL Deployment with First Auto-Configuring CPE," Oct. 1, 2001, http://www.netility.com/3100_pr.html, printed Sep. 2, 2003.

Netility Corporation, "Netility Technology Overview," http://www.netility.com/technology_overview.html, printed Sep. 2, 2003, 1 page.

Netility Corporation, "Netility Configuration System," http://www.netility.com/nc.html, printed Sep. 2, 2003, 1 page.

Netility Corporation, "Netility Makes Patent-Pending Auto-Configuration and Auto-Update Technology Available for Licensing," http://www.netility.com/technology-licensing_pr.html, printed Sep. 2, 2203, pp. 1-2.

"Frame Relay Fast Packet Switching," Frame Relay Tutorial, Sangoma Technologies, Inc., http://www.sangoma.com, Nov. 8, 1999, pp. 1-3.

T. Bradley, et al., "Inverse Address Resolution Protocol," The Internet Society, Sep. 1998, pp. 1-10.

U.S. Appl. No. 10/422,227, Arnold Stamler, et al., "Method and Apparatus Providing Automatic Connection Announcement From A Modular Network Device To A Network Management Point," filed Apr. 23, 2003, Not Published.

U.S. Appl. No. 10/422,231, Arnold Stamler, "Method and Apparatus For Automatically Synchronizing A Unique Identifier Of A Network Device," filed Apr. 23, 2003, Not Published.

U.S. Appl. No. 10/434,586, Arnold Stamler, et al., "Method and Apparatus Providing Automatic Provisioning Of Modular Network Devices," filed May 8, 2003, Not Published.

OpenROUTE Networks, Inc.; "Using the ARP and Inverse ARP Protocols;" Copyright 1998, OpenROUTE Networks, Inc.; 8 pages.

Comer, Douglas E., "Computer Networks and Internets;" Copyright 1997, Prentice Hall, Inc.; 3 pages.

The Gale Group, "Summagraphics Introduces New Tablet Driver", News Release, p. 1, Mar. 19, 1990, Summagraphics Corporation.

EMC Corporation, "Partner Solution for Microsoft® Systems Architecture Internet Data Center," Version 1.5, Chapter 2, Installing Network Devices, 2002, 41 pages.

\* cited by examiner

METHOD AND APPARATUS PROVIDING AUTOMATIC CONNECTION ANNOUNCEMENT FROM A MODULAR NETWORK DEVICE TO A NETWORK MANAGEMENT POINT

CROSS REFERENCE TO RELATED APPLICATIONS

This application is related to U.S. application Ser. No. 10/422,231, filed on even date herewith, entitled "Method and Apparatus For Automatically Synchronizing a Unique Identifier of a Network Device", by Arnold Stamler, the entire disclosure of which is hereby incorporated by reference for all purposes as if fully set forth herein.

FIELD OF THE INVENTION

The present invention generally relates to deploying network devices. The invention relates more specifically to a method and apparatus providing automatic provisioning for modular network devices.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Broadband network access is now widely available. In general, subscribers to broadband service that is provided by a service provider use a network device, such as a broadband router or gateway, to connect a personal computer or other end station to the service provider's network and obtain service. Automatic network configuration provisioning systems are now available for use in generating and downloading sets of configuration instructions, or configuration files, for network devices that are deployed in the field to subscribers of services provided by service providers. Such provisioning can occur automatically, without requiring a subscriber to manually enter configuration commands, and without requiring a technician associated with a network service provider to visit the subscriber and configure the device.

In one example approach, a vendor manufactures of customer premises equipment (CPE) network devices, and "drop-ships" the CPEs to the premises of subscribers of a network service provider. The CPEs are shipped with a generic bootstrap configuration that is copied from or generated at the vendor based on a standard template or format specified by the service provider. When a subscriber installs and powers-up a CPE, under control of the bootstrap configuration the CPE uses an interface specified in the bootstrap configuration to contact a configuration server associated with the service provider. The configuration server downloads a permanent, application-specific configuration to the CPE, which executes the received configuration and begins normal operation.

Standardized, template-based configurations contain configuration commands that refer to line cards, modules and interfaces by a specific slot or chassis location. Thus, the use of standardized template configurations requires that all the target hardware devices have a known, fixed hardware configuration, uniform for all network subscribers, so that the configuration can contain proper fixed references to slot locations.

However, many network devices are now made using a modular architecture in which the location of line cards and other components may vary from device to device, and may vary among units of the same device model. As the slots on a modular device are identical, any type of line card can be plugged into any slot. Thus, the manufacturer can package one device with multiple line cards in many combinations. Typically network devices comprise a chassis that supports one or more line cards for processing ATM, serial, or Ethernet data. Each line card has one or more interfaces. Configuration commands determine specific functions of the interfaces. For example, in a bootstrap configuration template, a particular configuration command in the template may instruct the device to configure slot 1, interface 3 and configure it as a serial interface. A service provider may use the same template for 1,000 devices that are deployed to its subscribers. However, if the devices are modular and do not have a line card in slot 1, or the device has a card in that slot that cannot provide a serial interface, the template configuration will not work and the device cannot obtain its permanent configuration.

While the inventory within a device chassis is deterministic at time of shipping from manufacturing, line-cards or modules are manually placed in the chassis. Therefore, controlling which line-cards or modules ultimately are placed in which slots is a labor-intensive problem, subject to human error and has had no known cost-effective, scalable solution. Therefore, to date, there has been no way to automate the configuration of modularized network devices with templates.

In this scenario, past approaches to automatic provisioning have not met with success. For example, with modularized routers that use a template-based configuration that specifies a particular slot that does not actually contain a line card with a necessary interface, the router cannot connect to a configuration server or other management point. Now, however, with modularized devices and the increasing use of drop shipment to deliver devices directly to subscribers, service providers need an improved automated provisioning process that can still use configuration templates.

In one known approach, Nortel Networks offers a customized template mechanism residing in the network management domain that allows the administrator to specify that a configuration associated with a given line card will only occur if that line card is in its correct intended slot. Otherwise, a controlled failure is generated during the provisioning of the device and the administrator is notified. This approach does not address automation of deployment workflow.

Further, the large majority of modules and line cards that plug into Nortel devices are "dumb" and have no way of self-announcing themselves upon device power-up or insertion or removal of a device. Even the fewer number of newer intelligent cards simply self-announce physical attributes such as type of card and slot insertion point, but these attributes are inadequate to support automated provisioning of network devices. There is a need for a way to provide a high-level inventory event on-behalf of all cards in the device, including the set of device-wide absolute references to all physical interfaces that can be provisioned on each card. Further, there is a need to receive, at a management point, an inventory of unpopulated or empty slots within the device chassis. Having numerous other inventory details reported about each card would be beneficial. Such higher-level inventory information is essential to the automation of network management functions such as provisioning.

In another known approach, Cisco Systems, Inc. offers a "Config Express" service that allows customers to specify a device configuration that Cisco writes into each router or other device at manufacturing time. This service is available for fixed chassis routers only, and it cannot be extended to modular devices.

In another known approach, many cable modems of various vendors support a mechanism for automatically acquiring their configuration. However, such devices are not modular devices, and they need a TFTP agent server for the mechanism to work. Most service providers will not use TFTP protocols to communicate to subscriber CPE devices because of lack of security. Thus, there is a need for an approach that is compatible with secure protocols.

Further, the approach of some vendors such as Netility is to license imbedded technology to support automated communication of configuration information to devices. However, this approach does not support modular devices in which the location of line cards and modules may vary.

Based on the foregoing, there is a clear need for an approach for automatically provisioning of modular network devices.

There is a specific need for an approach that can use pre-specified configuration templates to deliver a consistent configuration to modular devices.

There is also a particular need for an automated configuration approach that is compatible with drop shipment practices.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1A:
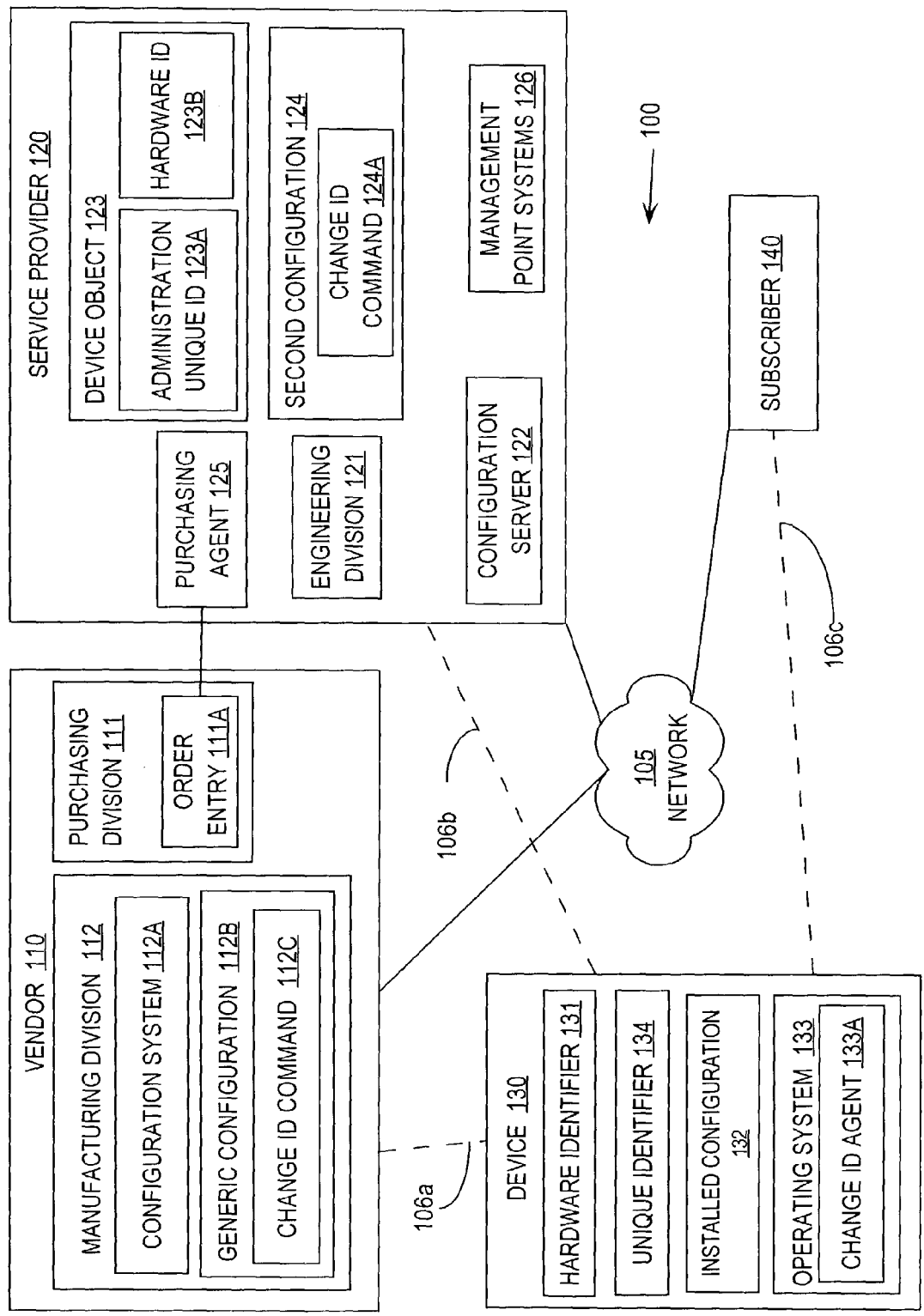
FIG. 1A is a block diagram depicting a network context in which an automatic provisioning system may be used.

A method and apparatus for providing automatic provisioning for modular network devices is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural Overview—Order and Provisioning Context
3.0 Method of Automatically Provisioning Network Devices
 3.1 Overview
 3.2 Process of Determining a Communication Channel
 3.3 Self-Initiating a Device Inventory Report
 3.4 Generating an Application-Specific Configuration
 3.5 Operational Example
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for provisioning modular network devices. A generic startup configuration is placed on the device; the configuration comprises commands for configuring interfaces on the device. At the device, each interface on the device is configured with commands associated with the interface. The device then attempts to connect with a management point through the current interface. If the current interface can connect to the management point, then an inventory of all interfaces associated with the device is self-initiated and automatically communicated by the device to the management point.

In other aspects, based on the inventory information, a configuration template containing relative interface references may be resolved into a permanent device configuration that includes absolute interface references. As a result, modular network devices in which interfaces of various types are installed at different slot locations may acquire the same permanent configuration, automatically under supervision of a remote management station.

In other aspects, the inventory encompasses a computer apparatus and a computer-readable medium configured to carry out the foregoing steps.

In one aspect, the approaches herein provide, unlike past approaches, reliable transmission of timely accurate device modular inventory information that is initiated from the device dynamically or "just-in-time" in response to changes to the device's hardware configuration, whether such changes occur online or across power-cycles of a device. Further, an automated configuration approach for modular devices is provided using the device-initiated inventory functionality. The approaches herein may be used for devices that are delivered as part of deployment of enterprise networks, or as part of deploying customer premises equipment to subscribers of network service providers, or in other contexts.

This approach generally comprises three components: establishing a connection from the device to a management point for transmission of device inventory information; initiation of inventory messages from the device to the management point, in which the messages describe the actual inventory of the device; and automatically generating a configuration for the device, based on the inventory messages, by the management point.

Establishment of a channel for sending modular inventory is generally performed as follows. A device dynamically discovers which of its interfaces, across multiple media types, can self-initiate a channel to the management point for the sending of modular inventory. Before physically deploying devices, a set of parameterized configuration commands are entered into the device's bootstrap configuration. The parameterized configuration commands facilitate performing, within the device, a dynamic self-discovery of interfaces through pinging the management point, across multiple interfaces and interface types. The self-discovery process continues across all slots until connectivity to the management point is detected.

Because the bootstrap configuration approach is generic with respect to all deployed devices of a given type, a service provider can define a single bootstrap configuration that can be applied in an automated fashion at pre-deployment time, even as part of the manufacturing process. The bootstrap configuration provides the minimal functionality necessary for a device to announce its inventory and then acquire its actual application configuration.

Sending modular inventory from the device to the management point is performed as follows. Once a connection is established from the device to the management point, the device sends an inventory of its modules, interface names and slot insertion points to the management point. SSL or other encryption approaches may be used to enforce security. The same inventory information is published each time the device contacts the management point, and dynamically whenever any modules are inserted or removed online.

Unlike prior approaches, the present approaches provide the only known mechanism by which a device initiates reporting that there has been a change to internal inventory and also detects and reports, on behalf of all plugged-in cards, key information values such as Module ID as extracted from the module's hardware PROM, slot number, and a set of absolute references to all interfaces that can be provisioned on each card. The approaches herein are also unique in that they include an inventory of unpopulated or empty slots within the chassis. Further, the inventory message is initiated from the device in response to online insertion or removal of cards, as well as changes in hardware configuration across power-cycles. Self-initiation of an inventory message also solves the problem of that a device could be behind a firewall.

Consumption of modular inventory information by the management point for automatically custom building configuration generally is performed as follows, in one embodiment. At administration time, each device is logically represented in a database as a logical device object that corresponds to the device. Associated with this device object is a set of logical objects that correspond to the modules that are expected by the provisioning system to be plugged into the device's chassis. Associated with each module object is a configuration template that expresses the intended configuration of interfaces that reside on the module. Each template uses a syntax that avoids any slot references that would be inherent in interface references directed to a slot-pluggable module. Rather than have absolute interface references, the template uses relative interface references, relative to the $1^{st}$ or $zero^{th}$ interface of a given type.

A concatenation of all templates for all modules associated with the device object forms a kind of single parametric configuration, pending instantiation upon receipt of inventory from a specific instance of device. Upon receiving inventory information from the device, the management point updates its database, and then resolves the object template relative interface references for each module into absolute interface references as reported in the inventory from the device.

In one specific embodiment, based on an inventory message from a device, the management point selects a database entry for the device object. Modules are identified by Module ID (Product code). For each module ID within the inventory from the device, the management point finds a matching module ID in the device object. For each interface type or prefix in the inventory message from the device, the management point sorts interfaces by their numerical value, and substitutes inventory from the sorted list into corresponding device object relative interfaces of the same type, from lowest to highest numerical value.

Based on the above process, the parametric configuration of the device object which contains relative interface references is resolved into a fully instantiated configuration which includes absolute slot specific interface references. The final configuration is returned to the device.

In general, the approaches herein provide for generating a high-level inventory event or report relating to all cards in a network device. The inventory event includes each card's type, slot, and a set of device-wide absolute references to all physical interfaces that can be provisioned on each card. Further, the approaches herein include an inventory of unpopulated or empty slots within the device chassis. Additionally, numerous other inventory details are reported about each card. Such higher-level inventory information facilitates automation of network management functions such as provisioning. Furthermore, the dynamic, "just-in-time" reporting of device inventory, which is initiated from the device in response to online insertion or removal of cards, as well as changes in hardware configuration across power-cycles, represents a significant improvement over past approaches.

Using the approaches herein, service providers can achieve sharp cost reductions. By eliminating a "truck roll" to the customer premises, savings of hundreds of dollars per CPE device is realized. Further, the accelerated rate of deployment facilitated by this solution translates into a proportionally accelerated clearing of order backlogs for device vendors.

The approaches herein also may be used for device discovery to support vendor sales of service contracts. Currently, the cost of a service contract to the customer typically depends on the type and amount of hardware inventory that is present in the network. Further, devices behind a firewall cannot be polled using SNMP polling discovery mechanisms. As a result, a vendor may lose service contract revenue because the vendor cannot determine what network hardware is actually in use at a particular customer that uses a firewall. Using the approaches herein, devices self initiate and announce inventory from the device outbound to the management point. Thus, a device behind a firewall is not an obstacle.

2.0 Structural Overview—Provisioning Context

FIG. 1A is a block diagram depicting a system for synchronizing the unique identifier of a device, according to one embodiment.

A system 100 comprises a Vendor 110 of a Device 130, a Service Provider 120 of the Device 130, and a Subscriber 140 to the Device 130. Although vendors, service providers, and subscribers may order many devices, for the purposes of illustrating a clear example, System 100 depicts one such device (130). Vendor 110, Service Provider 120, and Subscriber 140 may communicate with one another electronically or through manual means. As one example, Vendor 110 is communicatively coupled to Service Provider 120 and to Subscriber 140 through a network 105, which may comprise one or more local area networks, wide area networks, internetworks, etc. At various times or points in the processes described herein, Device 130 is located within domains of Vendor 110, Service Provider 120, or Subscriber 140, as indicated by dashed lines 106a, 106b, 106c.

Device 130 comprises a Hardware Identifier 131 that is assigned to Device 130 by a Manufacturing Division 112 associated with Vendor 110. The Manufacturing Division 112 may assign any sequence of characters as the Hardware Identifier 131. For example, these characters may include, but are not limited to, alphanumeric and special characters such as "@", "#", "$", "%", "*".

According to one embodiment, a serial number associated with some component of Device 130, such as its chassis or CPU, is used as the Hardware Identifier 131. The Device 130 may acquire its Hardware Identifier 131 using any of several mechanisms, including self-discovery. Examples of identifier values that Device 130 may "self-discover" and assign to Hardware Identifier 131, include, but are not limited to, the chassis serial number or the MAC address. According to another embodiment, the Hardware Identifier 131 may be manually inputted into Device 130 as part of manufacturing or an initial configuration process.

Device 130 further comprises a Unique Identifier 134 that uniquely identifies Device 130. For example, the value "xyz" may be assigned as the Unique Identifier 134 for Device 130 whereas the value "abc" may be assigned as the unique identifier for a different device. In contrast to Hardware Identifier 131, Unique Identifier 134 is changeable when Device 130 is in operation. Configuration commands may instruct Device 130 to adopt its Hardware Identifier 131 as its Unique Identifier 134, or to adopt some other value as its Unique Identifier.

At the time of manufacturing, Device 130 is configured with an Installed Configuration 132. The Installed Configuration 132 may include commands for changing the value of the Unique Identifier 134. Device 130 includes an Operating System 133, among other things, for executing commands associated with the Installed Configuration 132.

According to one embodiment, Operating System 133 includes an Inventory Reporting Agent 133A comprising instructions which, when executed by Device 130, cause the device to self-initiate a report of its internal inventory of line cards and interfaces to Management Point Systems 126 or other elements of Service Provider 120. Specific mechanisms for initiating an inventory report and the format of a report are described further below.

Vendor 110 may comprise a Purchasing Division 111 to handle orders from Service Provider 120 for Device 130 and a Manufacturing Division 112 for manufacturing the Device 130. According to one embodiment, Purchasing Division 111 comprises an Order Entry application 111A for communicating purchasing information from Vendor 110 to Service Provider 120. According to one embodiment, the Order Entry application 111A is used to communicate the Hardware Identifier 131 for Device 130 to Service Provider 120. For example, Order Entry application 111A may communicate the Hardware Identifier 131 for Device 130 to Service Provider 120 in response to a request from the Service Provider for current status about an order for the device.

Configuration System 112A is a mechanism, provided by the Manufacturing Division 112, for the Service Provider 120 to communicate the configuration that the Service Provider 120 wants the Vendor 110 to use as the Installed Configuration 132 for a particular order or Device 130. According to one embodiment, Configuration System 112A is Configuration Express as provided by Cisco Systems, Inc., San Jose, Calif. Service Provider 120 communicates a Generic Configuration 112B to the Vendor 110 through Configuration System 112A. According to one embodiment, the Generic Configuration 112B is a bootstrap configuration that is loaded as the Installed Configuration 132 of Device 130 when manufacturing of Device 130 is complete.

According to one embodiment, the Generic Configuration 112B comprises a bootstrap configuration. The Generic Configuration 112B contains instructions which, when executed by Device 130, enable the Device to determine which of several line cards or interfaces in the Device can communicate through network 105 to Configuration Server 122. Specific processes for self-discovering a connected interface are described further below.

In one embodiment, Service Provider 120 comprises an Engineering Division 121, a Device Object 123, a Purchasing Agent 125, a Configuration Template 124, a Configuration Server 122, and Management Point Systems 126. Engineering Division 121 defines the Generic Configuration 112B and communicates the Generic Configuration 112B to the Vendor 110 with the Configuration System 112A.

Device Object 123 is a logical representation of the Device 130 that is maintained by Service Provider 120 for purposes of tracking device orders and deployments. According to one embodiment, the Device Object 123 maps an Administration Unique ID 123A to a Hardware Identifier 123B. The Administration Unique ID 123A holds a value that is internally generated by Service Provider 120 to uniquely identify a device that has been ordered by Subscriber 140 before the Service Provider receives a hardware identifier or other unique identifier that is actually associated with a particular device such as Device 130. The Administration Unique ID 123A uniquely identifies a device that a particular subscriber, such as Subscriber 140, has ordered or will order in the future. Later, an order for a device may become associated with a particular device, such as Device 130, by assigning Hardware Identifier 131 of Device 130 to the Hardware Identifier 123B of Device Object 123. For example, the Order Entry application 111A communicates the Hardware Identifier 131 of Device 130 to the Service Provider 120 in response to a request from the Service Provider for an update about a particular order. Service Provider 120 may then assign the value of the Hardware Identifier 131 to the Hardware Identifier 123B in the Device Object 123.

According to one embodiment, Purchasing Agent 125 places an order with the Vendor 112 for a device to be used by Subscriber 140. The Purchasing Agent 125 may receive the value associated with the Administration Unique Identifier 123A from Device Object 123 to place and track the order. The Purchasing Agent 125 may communicate the value of the Administration Unique Identifier 123A to the Configuration System 112A as part of placing an order with Vendor 110.

According to one embodiment, the Configuration Template 124 is a partially complete configuration that the Service Provider 120 specifically wants installed as the Installed Configuration 132 for Device 130 for Subscriber 140. For example, the Configuration Template 124 may contain commands or parameter values that are specific to an operating environment or business environment of Subscriber 140. Further, the Configuration Template 124 contains one or more substitution strings for which values derived from an actual inventory of Device 130 are substituted before the configuration is provided to the device.

Thus, while the Generic Configuration 112B may be sufficient for initial configuration of all devices deployed by the Service Provider 120, for a particular Subscriber 140, a final or application-specific configuration is needed. In an embodiment, the final or application-specific configuration is created based on populating the Configuration Template 124 with values derived from an inventory report received from the device. Specific mechanisms for substituting values and generating a final configuration based on a template are described further below.

According to one embodiment, Configuration Template 124 contains one or more Substitution Strings 124A, which acts as a placeholder or marker that specifies a location for substituting in a value that is obtained from an inventory report received from Device 130. Using mechanisms described further below, the Configuration Template 124 is processed by substituting inventory values to create a final configuration, which is downloaded to Device 130 and becomes the Installed Configuration 132. Substitution Strings 124A may be used for substituting any desired parameter value into a configuration template.

According to one embodiment, the Configuration Server 122 creates and transmits a final configuration based on the Configuration Template 124 to Device 130 at Subscriber 140. According to one embodiment, Configuration Server 122 creates the final configuration based on Configuration Template 124 when Device 130 connects to the Configuration Server and requests a configuration. According to one embodiment, the Configuration Server 112 is the Cisco CNS 2100 Series Intelligence Engine, from Cisco Systems, Inc.

According to one embodiment, Management Point Systems 126 are systems that are interested in Device 130, its inventory, or information that it generates. Examples of Management Point Systems 126 include, but are not limited to, billing systems, provisioning systems, and fault detection systems. As depicted, Management Point Systems 126 are part of Service Provider 120, however, Management Point Systems 126 may be any systems that are informed when inventory in Device 130 changes or when other events of interest occur with respect to the Device.

Figure 1B:
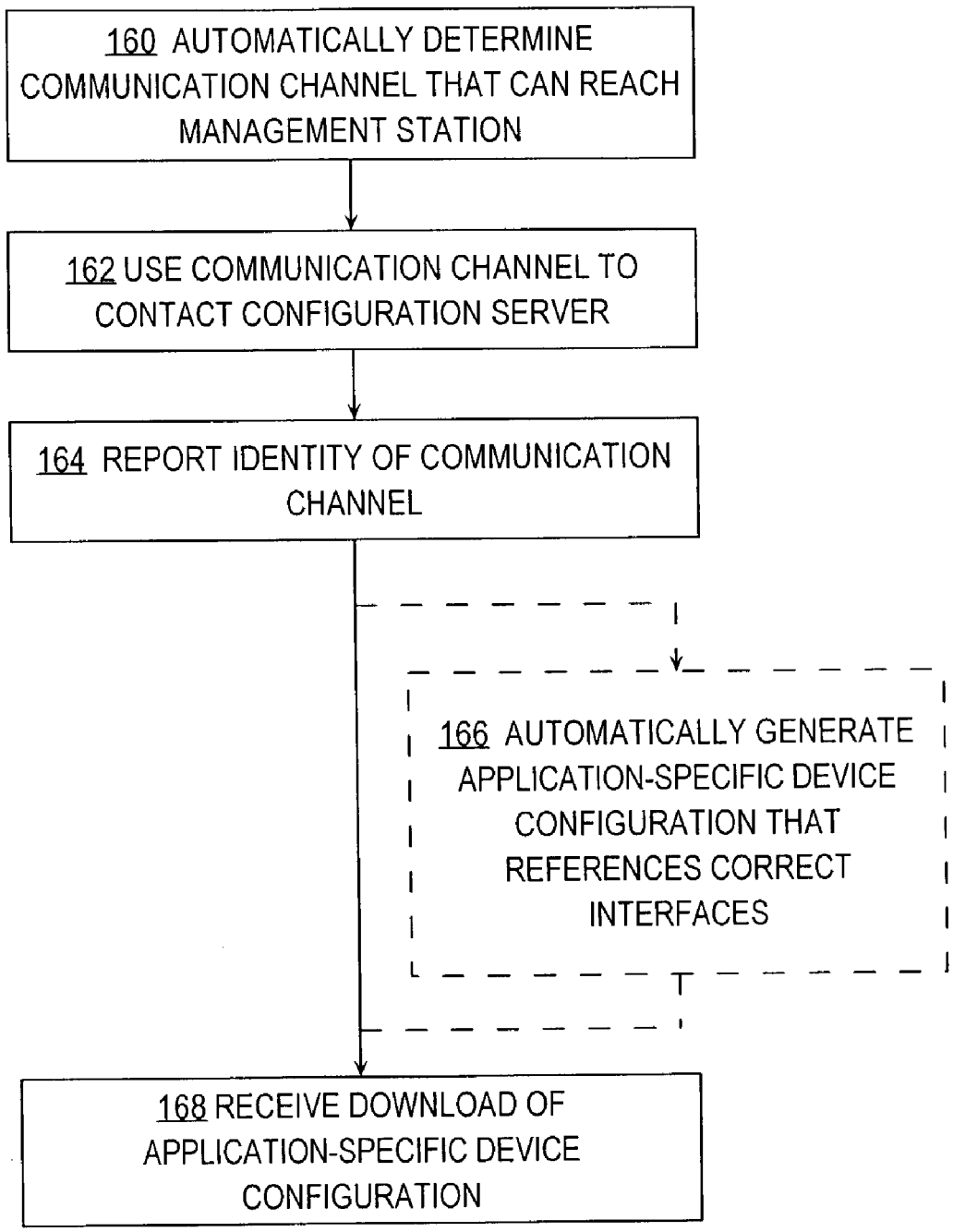
FIG. 1B is a flow diagram showing a high level overview of a process for automatically provisioning a network device.

FIG. 1B is a flow diagram showing a high level overview of a process for automatically provisioning a network device.

In block 160, the process automatically determines a communication channel that can reach a management station. Details of example methods for determining the communication channel are described below. In general, a device self-discovers an interface that has connectivity to a management station, regardless of the physical chassis location of a line card or module that contains the interface.

In block 162, the communication channel is used to contact a configuration server. The configuration server may form a part of the management station that was contacted in block 160. In block 164, the identity of the communication channel, and other device inventory information, is automatically reported on the communication channel to the management station. Unlike past approaches, a report of the inventory information is self-initiated by the device.

In block 166, an application-specific device configuration is generated. The configuration references correct interface locations of the device.

In block 168, the application-specific device configuration is received, typically by download to the device that performed steps 160 to 164, inclusive. Block 166 is shown in phantom lines in FIG. 1B because it may be performed by the management station. In contrast, other steps of FIG. 1B generally are performed by a network device, such as a subscriber CPE device.

3.0 Method of Automatically Provisioning Modular Network Devices

3.1 Overview

According to one embodiment, automatically provisioning modular network devices is facilitated by a configuration command that can instruct the device to connect to a configuration server without specifying which interface to use for the connection.

In one specific embodiment, the configuration command is "cns connect-intf" and forms part of the command-line interface (CLI) of a network device operating system. The command resembles, in syntax, the "interface" command that forms part of the Internetworking Operating System (IOS) from Cisco Systems, Inc., except that no interface number or slot is specified, only an interface prefix. The command instructs the device to connect to a configuration server termed "cns" using any available interface matching the specified prefix.

Upon executing the specified configuration command, a device will succeed in connecting to a configuration server regardless of the chassis location of particular modules. In one embodiment, this command is stored in a startup configuration of the device. When the device reboots, the command causes the device to iterate through all interfaces in the device that have the same prefix type.

For each interface, a well-formed "interface" CLI command is internally built and applied dynamically using the iterated interface chassis slot and interface number. The internally created "interface" command makes use of any sub-mode command lines that were specified in the original "cns config connect-intf" command. Each such internally created "interface" command is then applied internally to the device.

Thereafter, the device sends an inquiry to the configuration server, such as a "ping," and waits for a response. If no response is received within a specified timeout period, then the next interface is processed in the same manner. This process proceeds until the configuration server is contacted successfully.

Immediately subsequent to connection, the device presents to the configuration server its device unique identifier, and a specification of the line card inventory, module inventory, and chassis slot number insertion point for each module in the device. In one embodiment, the inventory is provided in an inventory message in that conforms to XML format. The inventory message reports, by device product-number, the slot chassis location of each module.

Based on the unique identifier of the connecting device and the various product numbers reported in the inventory message, the configuration server locates a matching configuration template in a device information repository. For example, in one embodiment, the configuration server searches a directory or other repository for pre-defined CLI templates for the main chassis configuration and a sub-configuration for each module.

The configuration server then processes the configuration templates into application-specific templates for the device. In an embodiment, the configuration server substitutes the actual slot numbers from the inventory message into slot number parameters of the templates. Thus, non-specific slot identifiers in the templates are resolved into slot-specific, subscriber-specific configuration commands that match the true module and slot hardware configuration of the target device. The configuration server returns the application-specific configuration to the target device. The target device invokes a command parser and applies the final configuration.

In one embodiment, device functions of the foregoing process may be implemented using a dedicated agent that runs under control of the network device operating system. In one specific embodiment, a CNS agent of Cisco IOS is modified to implement the functions described herein, and the configuration server is the Cisco IE2100.

In one implementation, in the IE2100 configuration server, the following modifications were made. Added to the device object, which represents the chassis global configuration of a device, is the sub-device object that represents a hardware module plugged into the chassis. Associated with the sub-device is a template for which a new syntax was invented to refer to device interfaces in a manner that is relative to the module the interfaces are physically defined on. For example, an interface is referenced as the 1$^{st}$ interface, 2$^{nd}$ interface, etc. This relative interface syntax removes the problem of having to pre-specify fixed slot numbers that cannot be predicted in a template. At run time, an actual slot number and interface number are substituted for the relative interface references using values obtained from the IOS XML inventory message that was received for the owner sub-device or device objects.

A pre-configured bootstrap configuration includes the "cns config connect-intf" command in the startup configuration. The bootstrap configuration is specified by a service provider as part of an online order for one or more devices. In one specific embodiment, the service provider uses "Config Express," an existing web-based service that is integrated with the Cisco Connection Online order entry system. Using Config Express, the service provider specifies a general subscriber non-specific bootstrap configuration intended to provide connectivity to the configuration server. The manufacturer then applies this configuration to all the devices of that order in a totally automated manufacturing step.

When the foregoing process is integrated with an automated order entry and configuration system, the process provides an extended end-to-end electronic business solution that inter-relates and provides for initial subscriber order-entry; Cisco manufacturing; Cisco shipping; final device provisioning; and subscriber billing.

3.2 Process of Determining a Communication Channel

A process of automatically determining, through internal self-discovery, at least one communication channel to a management station, and storing a configuration that retains knowledge of the discovery.

In the approach herein, a new form of configuration command is provided that has different syntax than prior commands and also causes different behavior in a configured device. In past approaches, a configuration command in a template configuration has instructed a device to connect to a management point using a particular interface of a particular type. For example, the command "interface ATM 1/0" has been used, followed by a set of sub-commands. This syntax has instructed a device to configure the 0$^{th}$ interface of the line card at slot 1 of the device as an ATM interface, to apply the sub-commands to that interface, and then attempt to connect to the management point with that interface.

In contrast, in the present approach, a command of the form

Cns config connect-intf<interface-type> is provided. For example, a bootstrap configuration may have the command "connect interface ATM," followed by sub-commands that apply to ATM interfaces. In response to executing the "connect interface" command, a device internally self-discovers all corresponding interfaces of all line cards and modules. For example, if the basic command is "connect interface ATM," then the device self-discovers all ATM interfaces available in all line cards and modules. For each particular interface, the device determines the correct syntax for referencing that interface. Further, the device internally builds a well-formed command for the particular interface, and attempts to configure the particular interface by applying the sub-commands to it.

The device then attempts to connect to the management point by issuing a "ping" command, or the equivalent, and receiving an acknowledgment from the management point. An acknowledgment failure may occur, for example, if no network cable is connected to the particular interface, or because a cable is connected to an interface of the same type in a different slot location. If connectivity is not achieved to the management point, the device rolls back or "undoes" the configuration of the particular interface, and attempts the same process on the next discovered interface. The foregoing process is repeated iteratively across all interfaces until connectivity is achieved.

If no connectivity is achieved for all interfaces of a particular type, then the next interface type is checked in the same way. For example, all ATM interfaces are checked first, and then all frame relay or serial interfaces are investigated. Such checks are defined in multiple contiguous blocks of configuration commands, in which one block applies to each interface technology type.

Figure 2A:
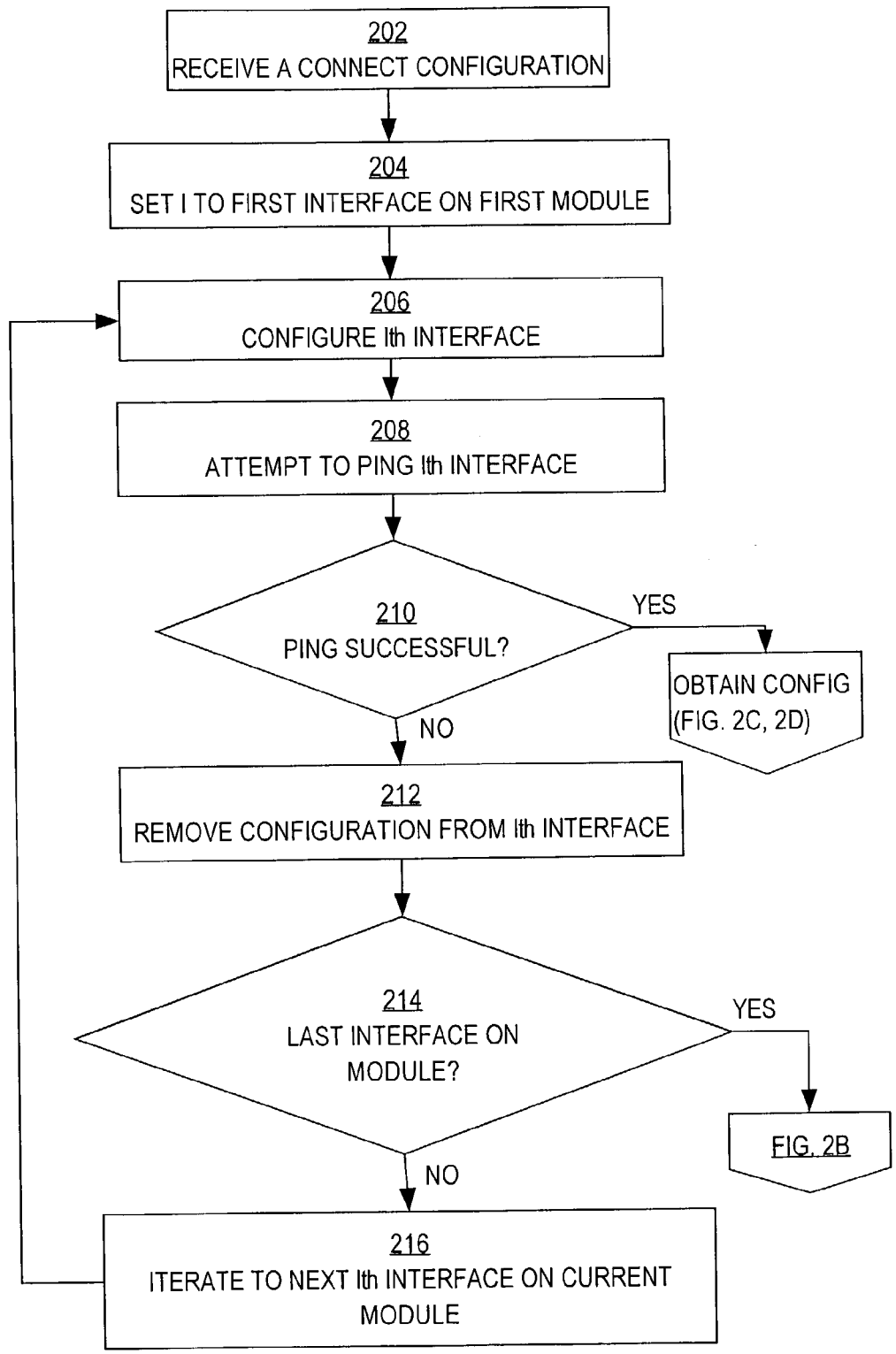
FIG. 2A is a flow diagram that illustrates a high level overview of one embodiment of a method for identifying an interface that can connect to a configuration server.
Figure 2B:
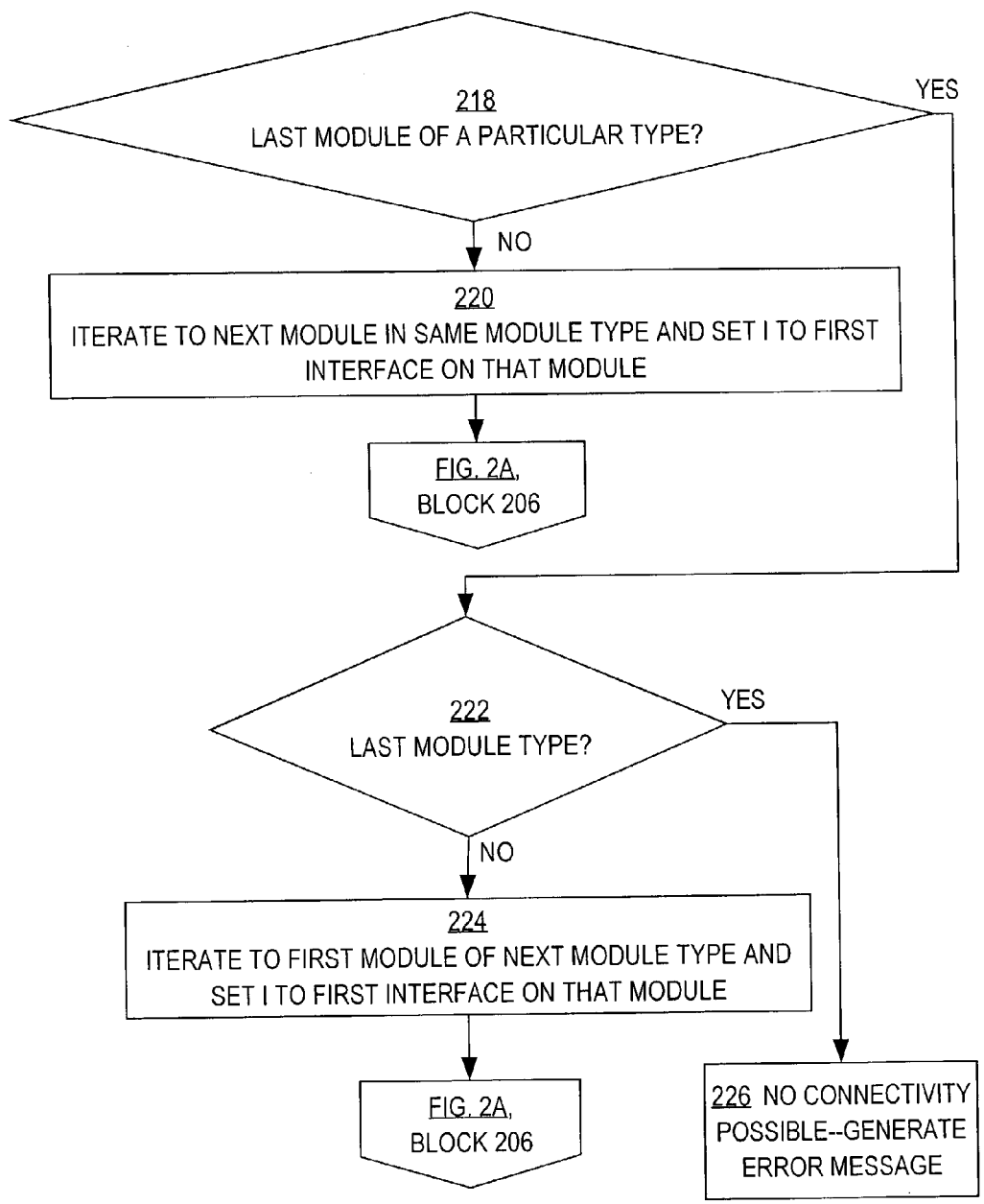
FIG. 2B is a flow diagram that illustrates further steps in the method of FIG. 2A.

FIG. 2A is a flow diagram that illustrates a high level overview of one embodiment of a method for identifying an interface that can connect to a configuration server. FIG. 2B is a flow diagram that illustrates further steps in the method of FIG. 2A.

Referring first to FIG. 2A, in block 202, a connection configuration is received. For example, a device receives a bootstrap configuration as part of the manufacturing process. The bootstrap configuration may have the format shown in Table 1, which is described in detail below.

Blocks 204 to 216 represent a process of iterating through interfaces of a device to identify an interface that has connectivity to a management station. In block 204, an index variable I is set to reference the first interface of the first module of the device. In block 206, the Ith interface is configured by applying sub-configuration commands to it. In block 208, the device attempts to issue a ping command, or the equivalent, using the Ith interface, to reach the management station.

In block 210, a test is performed to determine whether the ping attempt is successful. If the ping is successful, then connectivity is established, and the device may proceed to request a permanent configuration, as discussed below in connection with FIG. 2C, FIG. 2D. If the ping is not successful, then in block 212, the configuration applied at block 206 is removed.

In block 214, a test is performed to determine if the Ith interface is the last interface in the module then under consideration. If so, then control continues at FIG. 2B. Otherwise, if other interfaces in the same module remain to be tested for connectivity, then in block 216 the value of I is incremented and control returns to block 206 to consider the next available interface.

Referring now to FIG. 2B, block 218 is reached when all interfaces of a particular module have been tested; in block 218, a test is performed to determine whether the then-current module is the last module in the device of a particular type. In this context, "type" refers to technology type, such as ATM, serial, etc. If additional modules are present in the device, then in block 220, the next module of the same module type is considered and I is updated to reference the first interface in that module. Control then continues at block 206 of FIG. 2A.

However, if the test of block 218 determines that the last module of the current type has been considered, then in block 222 a test is performed to determine whether the device contains other modules of other types. If so, then in block 224 the next module type is considered. Otherwise, control reaches block 226 when all interfaces of all modules of all module types have been tested. If no connectivity is then available, then an error message is generated.

Table 1 depicts an example bootstrap configuration, according to one embodiment.

| Line No. | Commands |
|---|---|
| 1 | ! |
| 2 | Version 12.2 |
| 3 | ! |
| 4 | ip domain lookup |
| 5 | ip name-server 171.69.2.133 |
| 6 | ip name-server 171.70.168.183 |
| 7 | ip name-server 171.68.226.120 |
| 8 | ip domain name cisco.com |
| 9 | ! |
| 10 | username t3uplink password 0 cisco |
| 11 | ! |
| 12 | ip host-routing |
| 13 | ! |
| 14 | interface virtual-Template1 |
| 15 |    ip address negotiated |
| 16 |    ppp authentication pap chap |
| 17 | ! |
| 18 | cns config connect-intf Serial number 3 ping-interval 30 retries 10 |
| 19 |    config-cli no ip address |
| 20 |    config-cli encapsulation frame-relay |
| 21 |    config-cli keepalive 15 |
| 22 |    config-cli fair-queue |
| 23 |    config-cli shutdown |
| 24 |    config-cli no shutdown |
| 25 |    config-cli frame-relay interface-dlci 100 ppp Virtual-Template1 |
| 26 |    config-cli cns id virtual-Template1 ipaddress |
| 27 |    config-cli cns id Virtual-Template1 ipaddress event |
| 28 |    config-cli ip 0.0.0.0 0.0.0.0 & |
| 29 |    ! |
| 30 |    ! |
| 31 | cns config connect-intfPOS number 3 ping-interval 30 retries10 |
| 32 |    config-cli ip address slarp retry 2 |
| 33 |    config-cli crc 32 |
| 34 |    config-cli pos framing sdh |
| 35 |    config-cli pos scramble-atm |
| 36 |    config-cli pos flag c2 22 |
| 37 |    config-cli pos flag sls0 2 |
| 38 |    config-cli cns id & ipaddress |
| 39 |    config-cli cns id & ipaddress event |
| 40 |    config-cli ip route 0.0.0.0 0.0.0.0 & |
| 41 | ! |
| 42 | ! |
| 43 | cns config connect-intf ATM number 3 ping-interval 30 retries 10 |
| 44 |    config-cli no atm ilmi-keepalive |
| 45 |    config-cli pvc 14/14 |
| 46 |    config-cli inarp 1 |
| 47 |    config-cli ip addr inarp |
| 48 |    config-cli encapsulation aa15snap |
| 49 |    config-cli cns id & ipaddress |
| 50 |    config-cli cns id & ipaddress event |
| 51 |    config-cli ip route 0.0.0.0 0.0.0.0 & |
| 52 | ! |
| 53 | cns config connect-intf Async ping-interval 30 retries 10 |
| 54 |    config-cli ip address negotiated |
| 55 |    config-cli encapsulation ppp |
| 56 |    config-cli dialer in-band |
| 57 |    config-cli dialer string 79537 |
| 58 |    config-cli dialer-group 1 |
| 59 |    config-cli async default routing |
| 60 |    config-cli async mode interactive |
| 61 |    config-cli cns id & ipaddress |
| 62 |    config-cli cns id & ipaddress event |
| 63 |    config-cli ip route 0.0.0.0 0.0.0.0 & |
| 64 |    line-eli modem InOut |
| 65 |    line-cu transport input all |
| 66 |    line-cli autoselect ppp |
| 67 |    line-cli stopbits 1 |
| 68 |    line-cli speed 115200 |
| 69 |    line-cli flowcontrol hardware |
| 70 | ! |
| 71 | dialer-list 1 protocol ip permit |
| 72 | cns password cnsboot |
| 73 | cns inventory event |
| 74 | cns inventory config |
| 75 | cns config initial 10.1.27.10 event no-persist |
| 76 | ! |
| 77 | end |

Using the configuration of Table 1, a device can send information to a management point over any frame relay, POS or ATM interface located in any slot. If no such interface succeeds in contacting the management point, then the device attempts to establish a dial-up connection over the conventional telephone system using any available asynchronous modem in any slot. The configuration contains no specific interface or slot references. Connection to the management point is supported over multiple media types.

Lines 18 to 28 of Table 1 instruct a device to attempt a connection to a management point using available serial interfaces. Line 18 instructs the device to use a ping interval of 30 seconds and to attempt 10 retries before declaring a timeout. For all serial interfaces in all slots, the configuration of lines 19 to 28 is executed within the context of each specific interface. The ampersand ("&") in line 28 signifies a substitution macro for the specific instance of interface that is referenced in a particular iteration. The configuration attempts to ping the configuration server on each serial interface; if there is no response, then the process iterates to the next serial interface; if all serial interfaces are tried without success, then the next interface type is attempted.

In the example of Table 1, POS is the next interface type, as indicated by lines 31 to 40. The process described immediately above is repeated for all available POS interfaces. If the POS ping process is unsuccessful, then in lines 43 to 51, ATM interfaces are attempted. For the POS interfaces and ATM interfaces, a substitution macro is signified by the "&" symbol in lines 40 and 51, respectively.

If the device cannot establish ATM connectivity to the configuration server, then an asynchronous modem connection is attempted, as shown by lines 53-69. If all asynchronous modem interfaces are attempted and no connectivity is achieved to the management point, then no exchange of inventory or configuration information can occur, and an error message may be generated.

In lines 72 to 75 of Table 1, the configuration communicates inventory information to the management point as part of requesting a permanent, application-specific configuration.

Although the foregoing process has been described in terms of iterating through interfaces, the general principles described herein are applicable to any logical entity that forms a part of a line card and can be used for connectivity.

3.3 Self-Initiating a Device Inventory Report

In general, a process is provided by which a device self-initiates a report of its internal inventory. In one feature, the device successfully communicates the report to a configuration server. In another feature, the report comprises specified elements. In yet other features, the report is generated in response to a configuration change; the process may be interrupt-driven or device-driven.

Figure 2C:
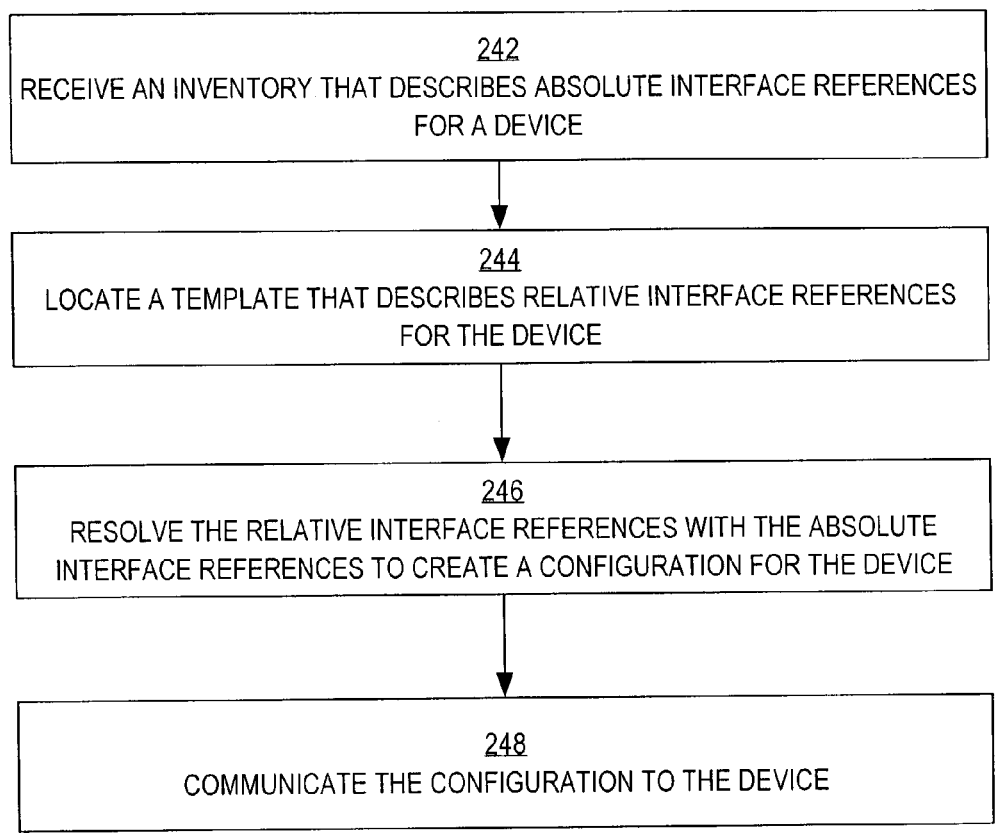
FIG. 2C is a flow diagram showing a process for automatically provisioning a device.
Figure 2D:
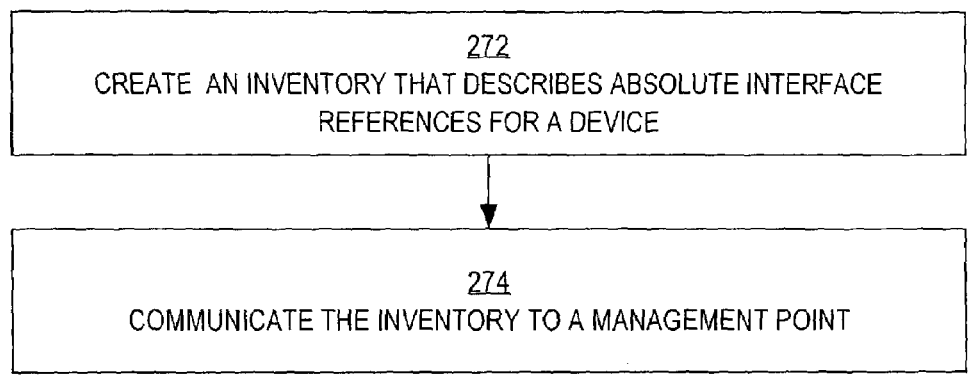
FIG. 2D is a flow diagram showing a process of device-initiated inventory reporting.

FIG. 2D is a flow diagram showing a process of device-initiated inventory reporting. In block 272, a device creates an inventory that describes absolute interface references for all interfaces in the device. In block 274, the inventory is communicated to a management point. Block 274 may involve communicating the inventory over the communication interface that was identified in the process of FIG. 2A, FIG. 2B. The inventory may be expressed as an XML message.

According to one embodiment, a device self-initiates an inventory report by sending a request to the management point to provide a permanent configuration for the device. Included in the request is a value that uniquely identifies the device. The device provides an inventory of each module type that is plugged into its chassis. For each module type, an inventory of interfaces on each particular module is provided. Each interface is identified using syntax that may be used in a configuration command to correctly access the associated interface. In one specific embodiment, the inventory is provided in XML form.

Using the inventory information provided in the configuration request message from the device, a management point can then generate an application-specific configuration or permanent configuration for the device, as described in the next section.

In one embodiment, the inventory is self-initiated by the device in response to a change in the configuration or inventory of the device. For example, when the device is powered up, or if modules are inserted into or removed from the chassis, the device initiates an inventory message to the management point. The inventory message updates the entire inventory of the device and thereby informs the management point about any changes that occurred. In an alternative embodiment, successive inventory messages provide only information about changes in inventory since the last inventory message sent by a device.

Further, in an embodiment, each inventory message identifies any slots in a device that are empty, and contain no line cards or modules.

The approaches herein offer numerous improvements over past approaches. For example, in past approaches, Simple Network Management Protocol (SNMP) is used to announce changes in device hardware by sending an SNMP trap. Management points have had to use several different techniques, which vary based on the device hardware that is involved, to determine what has changed in a device configuration based on a trap message. For example, management points have had to poll the device to obtain device internal inventory information, and compare received responses to known details about the inventory. This is complicated and often yields errors.

Further, the foregoing past approach cannot obtain information from devices that are secured behind firewalls, because by default most firewalls will not pass SNMP traffic. However, in the current approach this problem is overcome because the device initiates messages outward through the firewall.

3.4 Generating an Application-Specific Configuration

In general, a process is provided for resolving a set of relative interface references into absolute interface references based on real-time inventory from the device. In the process, a generic management point template configuration contains special characters signifying substitution strings. When inventory information is received from the device, the generic template configuration is modified by substituting device-specific inventory values for the substitution strings. In contrast, in past approaches, templates referred to slots and interface positions using fixed values.

FIG. 2C is a flow diagram showing a process for automatically provisioning a device. In general, FIG. 2C represents processing steps that are performed by a management station. In block 242, an inventory is received that describes absolute interface references for a device. For example, the inventory described herein with respect to FIG. 2D may be received from a device at a management station.

In block 244, a template that describes relative interface references for the device is located. Block 244 may involve retrieving, from a repository such as a directory or database, a template for a permanent device configuration based on a device type value that is received in the inventory from the device.

In block 246, relative interface references in the configuration template are resolved into absolute interface references based on the values that are received in the inventory from the device. In block 248, the resolved permanent configuration is downloaded to the device.

As an example, Table 2 depicts a management point template that may be used in relative interface resolution, according to one embodiment.

TABLE 2

EXAMPLE MANAGEMENT POINT TEMPLATE

| Line No. | Commands |
|---|---|
| 1 | ! |
| 2 | Interface Serial %Serial0% |
| 3 | ip address $ {LPDAP://this::attrName=IOSipaddress} 255.255.255.0 |
| 4 | no shutdown |
| 5 | ! |
| 6 | Interface Serial %Serial1% |
| 7 | ip address $ {LPDAP://this::attrName=IOSipaddress} 255.255.255.0 |
| 8 | no shutdown |
| 9 | ! |

Table 2 depicts commands on line 2 and line 6 that include relative interface reference for serial interfaces. The relative interface addresses may be replaced with absolute interface references from an inventory. For example, on line 2, the relative interface reference "%Serial0%" may be replaced with the absolute interface reference "Serial0/0" if this is appropriate based on information received from the device. Similarly, on line 6, the relative interface reference "%Serial1%" may be replaced with the absolute interface reference "Serial0/1". In general, an example of syntax for a substitution string is:

%<Type of interface><logical port number>%

According to an embodiment, the use of such relative references and templates with substitution strings also facilitates creating a computer memory representation of a device, as part of a management point application, using more sophisticated data structures. In past approaches, a management point application would represent a device in application memory as a single logical object in a database, keyed to a unique device identifier, such as a chassis number. The device object would be created at the management point at the time that the management point or its associated service provider issued an order for a particular device.

In the present approach, at the time that a service provider orders a device for delivery to a subscriber, a management point application creates a main device object. The main device object represents and is based on a chassis type of the device, and contains one or more sub objects. Further, the main device object is associated with or points to a configuration template, containing substitution strings of the type shown above in Table 2. The management point maintains one configuration template for each general type of device. For example, all main device objects for all Cisco 2600 routers that are deployed by a particular service operator are associated with the same configuration template.

Each sub object represents a module in the device. Based on the inventory, the management point dynamically creates or instantiates one or more sub objects based on the modules that are discovered in inventory. Thus, there is one sub object for each line card. Each sub object maps to a module of the device, and each sub object may carry a name that corresponds to a module type. Each module generally comprises a product identifier that is associated with a sub object. Sets of configuration commands associated with an interface of a module may be associated in the management point application with a corresponding sub object.

Such an object model also may be maintained in a persistent repository that is accessible to the management point. For example, an LDAP directory or database may be used.

Using this approach, a device may send a request for a permanent configuration to the management point. In the request, the device provides its unique device identifier. At the management point, based on the device identifier, the corresponding device object is located. The management point then retrieves the configuration template that is referenced by the device object. Values from the inventory message are substituted into the configuration template at locations indicated by the substitution strings. As a result, a final device configuration is created. The final device configuration is then downloaded to the device and is executed by the device.

3.5 Operational Example

Figure 3:
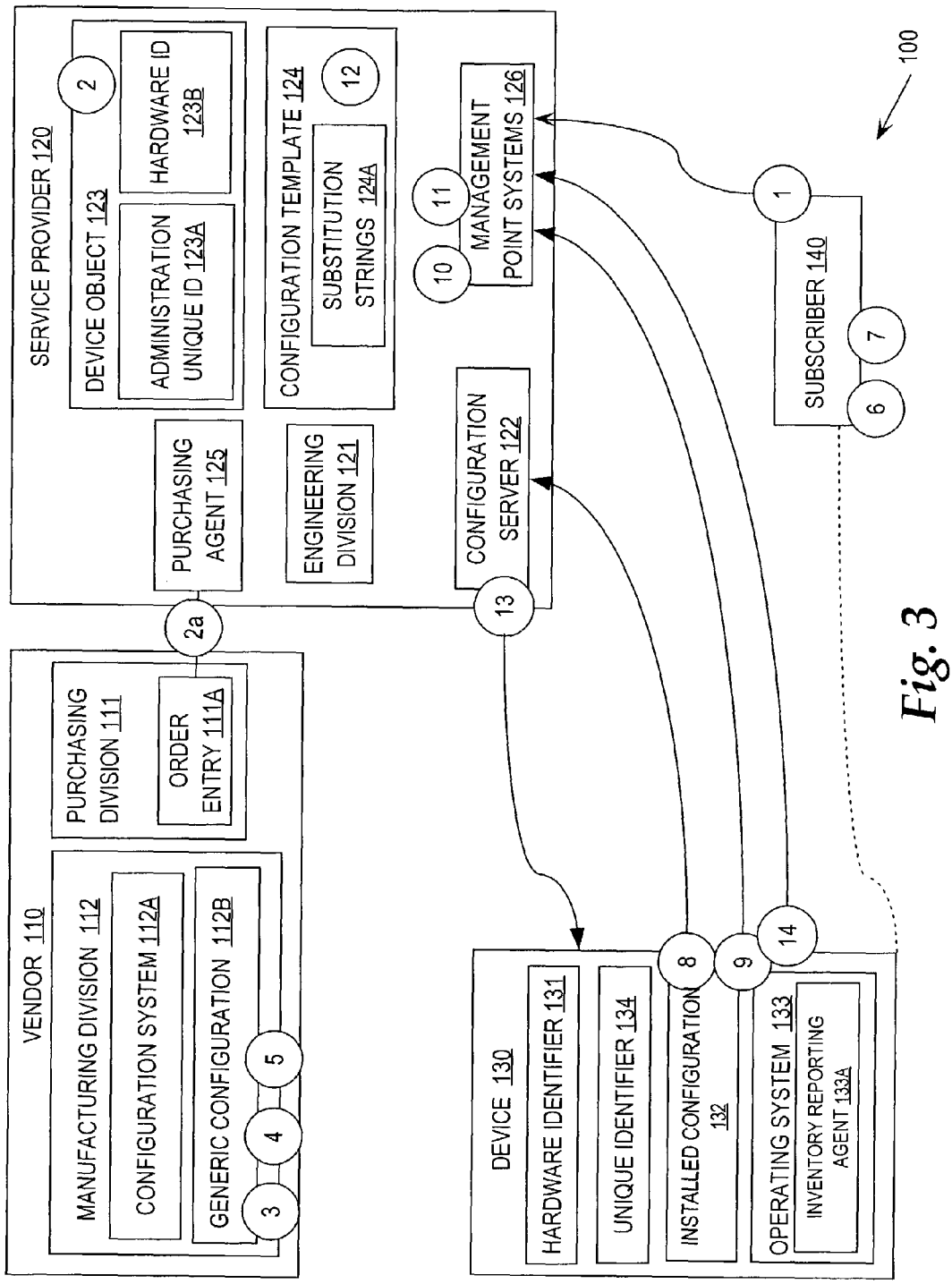
FIG. 3 is a block diagram that illustrates an operational example.

FIG. 3 is a block diagram illustrating an operational example of use of an embodiment.

At numeral 1), a subscriber orders a device that comprises a plurality of modules. At numeral 2), a device object is created for the device, and sub-objects are created for each of the modules. In this context, objects are programmatic entities that are created using software processes of the service provider for purposes of managing an order of an end user.

At numeral 3), a generic or preliminary bootstrap configuration is created for the device. The bootstrap configuration comprises commands for different types of modules that may be present in the device, such as an ATM module, serial module, Ethernet module, etc. At numeral 4), the bootstrap configuration is installed in the device. At numeral 5), the device is shipped to a subscriber.

At numeral 6), the subscriber manually inserts the modules into the device, if required. In other embodiments, the device is shipped with modules installed. At numeral 7), the subscriber powers-up or boots the device.

At numeral 8), the bootstrap configuration discovers an interface that may be used for connecting to a management point. In one embodiment, the bootstrap configuration executes instructions that search through the modules and the interfaces on the modules to find one interface that may be used for connecting to the management point. As the device iterates through the interfaces, a command is built to configure a particular interface and then the device attempts to ping the management point from the configured interface. If it cannot ping the management point, the configuration does not use that particular interface. An inventory of the interfaces is built as the device goes through the foregoing self-discovery process. At numeral 9), when the device is able to ping the management point through an interface, the inventory along with a device identifier is sent to the management point.

At numeral 10), the management point uses the device identifier to locate a device object that corresponds to the device. At numeral 11), the management point examines the device object and identifies a template that includes commands with relative addresses for modules and interfaces for the type of device that has contacted the management point.

At numeral 12), the inventory, device object, sub-objects, and template are used to create a permanent or application-specific configuration for the device. To create the permanent configuration, the relative interface addresses in the template are resolved to absolute addresses for the actual interfaces reflected in the inventory. At numeral 13), the configuration is transmitted to the device, where the configuration is installed.

At numeral 14), the device optionally may initiate further self-reporting of its inventory to the management point. According to one embodiment, this is done when the device configuration changes or an operational change occurs in the device. For example, self-reporting of inventory may occur when the device is powered down, powered up, or when a module is inserted or removed.

4.0 Implementation Mechanisms—Hardware Overview

Figure 4:
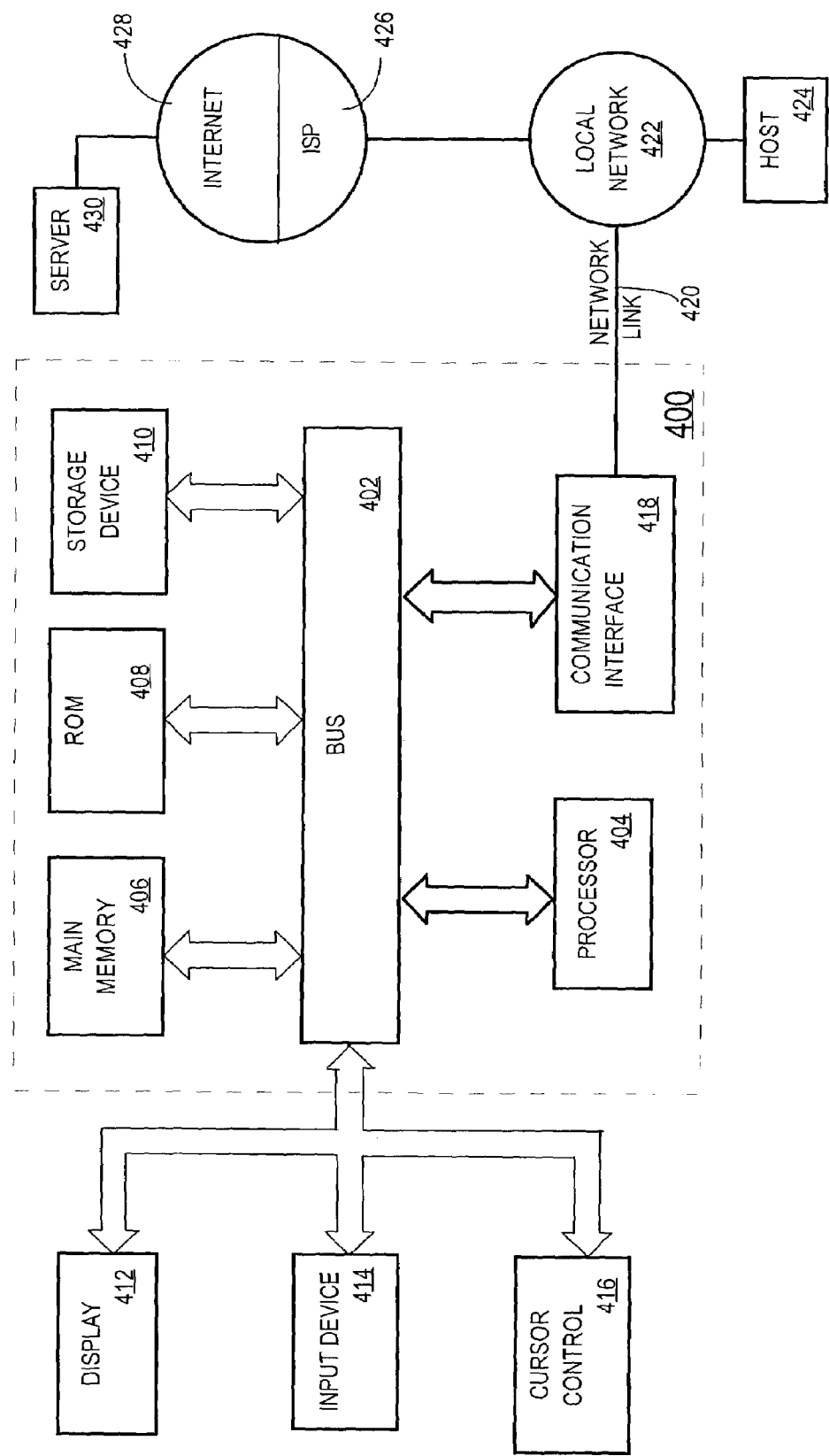
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for providing automatic provisioning for modular network devices. According to one embodiment of the invention, providing automatic provisioning for modular network devices are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for providing automatic provisioning for modular network devices as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

Accordingly, a method and apparatus providing automatic provisioning of modular network devices have been described. The embodiments disclosed herein solve at least two problems associated with the management of modular devices: automated configuration deployment and reliable maintenance of network inventory.

In one embodiment, the problem of automated configuration deployment is solved. In particular, modular equipment typically is deployed using manual pre-staging of the hardware by third party system integration partners. When economic conditions have been good, most service providers have not considered a manual pre-staging approach to be a problem. When economic conditions are unfavorable, the costs associated with manual pre-staging are considered significant. The automation characteristic of the approaches herein represents a major cost savings for deployment, by eliminating truck rolls and reducing the requirements for skilled network management personnel.

Further, the approaches herein solve the problem of how the network management inventory system can reliably gather network inventory that is accurate and timely. Current inventory gathering methods consist of a hodgepodge of improvisations, including word-of-mouth, manually populated desktop-based spreadsheets, and some limited use of SNMP. The SNMP approach is only available when devices are not behind a firewall or NAT. These approaches also are available on modular devices only provided the soft and hard configurations match up, so that there is at least connectivity to the management point. The existence of discrepancies between an inventory system database and the actual network inventory is a known problem, especially in large networks.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of provisioning modular network devices, the method comprising the computer-implemented steps of:
    receiving a configuration at a modular network device on a data network, wherein the modular network device comprises a plurality of slots into which one or more modules is plugged, and wherein the configuration comprises commands for configuring a plurality of network interfaces associated with the modular network device;
    at the modular network device, performing the steps of:
        setting one interface of the plurality of network interfaces as a current interface;
        configuring the current interface with at least one command associated with the configuration;
        attempting to connect with a management point over the data network through the current interface;
    determining whether the current interface can connect to the management point;
    in response to determining that the current interface cannot connect to the management point:
        setting a next interface of the plurality of network interfaces as the current interface, and
        repeating the step of configuring and the step of attempting to connect for the current interface; and
    in response to determining that the current interface can connect to the management point, the modular network device automatically communicating, to the management point, an inventory of each interface of the plurality of network interfaces associated with the modular network device.

2. A method as recited in claim 1, wherein the inventory further comprises information identifying one or more slots in the modular network device that contain no modules or interfaces.

3. A method as recited in claim 1, wherein a first subset of the commands associated with the configuration are for configuring interfaces for a first type of module, and a second subset of the commands associated with the configuration are for configuring interfaces for a second type of module, and
    wherein the step of configuring further comprises the steps of using the first subset of commands to configure the interfaces of the first type, and if no interfaces of the first type can connect to the management point, then
        using the second subset of commands to configure the interfaces of the second type;
        attempting to connect to the management point using the interfaces of the second type.

4. A method as recited in claim 3, further comprising attempting to connect to the management point from each interface of the second type only after attempting to connect to the management point from a last interface of the first type.

5. A method as recited in claim 3, wherein the type of modules with which the interfaces are associated is selected from a group consisting of serial, asynchronous transfer mode (ATM), and Packet-over-SONET/SDH (POS).

6. The method as recited in claim 1, further comprising the steps of:
    creating an inventory describing absolute interface references for the interfaces on the modular network device; and
    if the configured interface can be used to connect to the management point, then communicating the inventory to the management point.

7. The method as recited in claim 6, wherein the step of communicating the inventory to the management point further comprises the step of communicating the inventory in the form of an eXtensible Markup Language (XML) document.

8. The method as recited in claim 1, wherein the modular network device comprises pluggable modules and the interfaces are interfaces associated with the pluggable modules.

9. A computer-readable medium, which is a volatile or a non-volatile memory storing one or more sequences of instructions for provisioning modular network devices, which instructions, when executed by one or more processors, cause the one or more processors to carry out the steps of:
    receiving a configuration at a modular network device on a data network, wherein the modular network device comprises a plurality of slots into which one or more modules is plugged, and wherein the configuration comprises commands for configuring a plurality of network interfaces associated with the modular network device;
    at the modular network device, performing the steps of:
        setting one interface of the plurality of network interfaces as a current interface;
        configuring a current interface with at least one command associated with the configuration;
        attempting to connect with a management point over the data network through the current interface;
    determining whether the current interface can connect to the management point;
    in response to determining that the current interface cannot connect to the management point;
        setting a next interface of the plurality of network interfaces as the current interface, and
        repeating the step of configuring and the step of attempting to connect for the current interface; and
    in response to determining that the current interface can connect to the management point, the modular network device automatically communicating, to the management point, an inventory of each interface of the plurality of network interfaces associated with the modular network device.

10. A computer-readable storage medium as recited in claim 9, wherein the inventory further comprises information identifying one or more slots in the modular network device that contain no modules or interfaces.

11. A computer-readable storage medium as recited in claim 9, wherein a first subset of the commands associated with the configuration are for configuring interfaces for a first type of module, and a second subset of the commands associated with the configuration are for configuring interfaces for a second type of module, and
    wherein the step of configuring further comprises the steps of using the first subset of commands to configure the interfaces of the first type, and if no interfaces of the first type can connect to the management point, then
        using the second subset of commands to configure the interfaces of the second type;
        attempting to connect to the management point using the interfaces of the second type.

12. A computer-readable storage medium as recited in claim 11, which instructions, when executed by one or more processors, further cause the one or more processors to carry out the step of attempting to connect to the management point from each interface of the second type only after attempting to connect to the management point from a last interface of the first type.

13. A computer-readable storage medium as recited in claim 11, wherein the type of modules with which the interfaces are associated is selected from a group consisting of serial, asynchronous transfer mode (ATM), and Packet-over-SONET/SDH (POS).

14. The computer-readable storage medium as recited in claim 9, which instructions, when executed by one or more processors, further cause the one or more processors to carry out the steps of:
creating an inventory describing absolute interface references for the interfaces on the modular network device; and
if the configured interface can be used to connect to the management point, then communicating the inventory to the management point.

15. The computer-readable storage medium as recited in claim 14, wherein the step of communicating the inventory to the management point further comprises the step of communicating the inventory in the form of an eXtensible Markup Language (XML) document.

16. The computer-readable storage medium as recited in claim 9, wherein the modular network device comprises pluggable modules and the interfaces are interfaces associated with the pluggable modules.

17. An apparatus for provisioning modular network devices, comprising:
a processor;
means for receiving a configuration at a modular network device on a data network, wherein the modular network device comprises a plurality of slots into which one or more modules is plugged, and wherein the configuration comprises commands for configuring a plurality of network interfaces associated with the modular network device;
means for performing at the modular network device, the steps of:
setting one interface of the plurality of network interfaces as a current interface;
configuring a current interface with at least one command associated with the configuration;
attempting to connect with a management point over the data network through the current interface;
determining whether the current interface can connect to the management point;
in response to determining that the current interface cannot connect to the management point;
setting a next interface of the plurality of network interfaces as the current interface, and
repeating the step of configuring and the step of attempting to connect for the current interface; and
in response to determining that the current interface can connect to the management point, the modular network device automatically communicating, to the management point, an inventory of each interface of the plurality of network interfaces associated with the modular network device.

18. The apparatus as recited in claim 17, wherein the inventory further comprises information identifying one or more slots in the modular network device that contain no modules or interfaces.

19. The apparatus as recited in claim 17, wherein a first subset of the commands associated with the configuration are for configuring interfaces for a first type of module, and a second subset of the commands associated with the configuration are for configuring interfaces for a second type of module, and
wherein the means for configuring further comprises:
means for using the first subset of commands to configure the interfaces of the first type;
means for using the second subset of commands to configure the interfaces of the second type if no interfaces of the first type can connect to the management point; and
means for attempting to connect to the management point using the interfaces of the second type if no interfaces of the first type can connect to the management point.

20. The apparatus as recited in claim 19, further comprising means for attempting to connect to the management point from each interface of the second type only after attempting to connect to the management point from a last interface of the first type.

21. The apparatus as recited in claim 19, wherein the type of modules with which the interfaces are associated is selected from a group consisting of serial, asynchronous transfer mode (ATM), and Packet-over-SONET/SDH (POS).

22. The apparatus as recited in claim 17, further comprising:
means for creating an inventory describing absolute interface references for the interfaces on the modular network device; and
means for communicating the inventory to the management point if the configured interface can be used to connect to the management point.

23. The apparatus as recited in claim 22, wherein the means for communicating the inventory to the management point further comprises the step of communicating the inventory in the form of an eXtensible Markup Language (XML) document.

24. The apparatus as recited in claim 17, wherein the modular network device comprises pluggable modules and the interfaces are interfaces associated with the pluggable modules.

25. An apparatus for provisioning modular network devices comprising:
a network interface that is coupled to a data network for receiving one or more packet flows therefrom;
a processor;
one or more stored sequences of instructions which, when executed by the processor, cause the processor to carry out the steps of:
receiving a configuration at a modular network device on a data network, wherein the modular network device comprises a plurality of slots into which one or more modules is plugged, and wherein the configuration comprises commands for configuring a plurality of network interfaces associated with the modular network device;
at the modular network device, performing the steps of:
setting one interface of the plurality of network interfaces as a current interface;
configuring a current interface with at least one command associated with the configuration;
attempting to connect with a management point over the data network through the current interface;
determining whether the current interface can connect to the management point;
in response to determining that the current interface cannot connect to the management point;

setting a next interface of the plurality of network interfaces as the current interface, and repeating the step of configuring and the step of attempting to connect for the current interface; and in response to determining that the current interface can connect to the management point, the modular network device automatically communicating, to the management point, an inventory of each interface of the plurality of network interfaces associated with the modular network device.

26. The apparatus as recited in claim 25, wherein the inventory further comprises information identifying one or more slots in the modular network device that contain no modules or interfaces.

27. The apparatus as recited in claim 25, wherein a first subset of the commands associated with the configuration are for configuring interfaces for a first type of module, and a second subset of the commands associated with the configuration are for configuring interfaces for a second type of module, and wherein the step of configuring further comprises the steps of using the first subset of commands to configure the interfaces of the first type, and if no interfaces of the first type can connect to the management point, then using the second subset of commands to configure the interfaces of the second type;

attempting to connect to the management point using the interfaces of the second type.

28. The apparatus as recited in claim 27, wherein the stored sequences of instructions further cause the processor to carry out the step of attempting to connect to the management point from each interface of the second type only after attempting to connect to the management point from a last interface of the first type.

29. The apparatus as recited in claim 27, wherein the type of modules with which the interfaces are associated is selected from a group consisting of serial, asynchronous transfer mode (ATM), and Packet-over-SONET/SDH (POS).

30. The apparatus as recited in claim 25, wherein the stored sequences of instructions further cause the processor to carry out the steps of:

creating an inventory describing absolute interface references for the interfaces on the modular network device; and if the configured interface can be used to connect to the management point, then communicating the inventory to the management point.

31. The apparatus as recited in claim 30, wherein the step of communicating the inventory to the management point further comprises the step of communicating the inventory in the form of an eXtensible Markup Language (XML) document.

32. The apparatus as recited in claim 25, wherein the modular network device comprises pluggable modules and the interfaces are interfaces associated with the pluggable modules.

* * * * *

UNITED STATES PATENT AND TRADEMARK OFFICE
CERTIFICATE OF CORRECTION

PATENT NO. : 7,631,055 B1  Page 1 of 1
APPLICATION NO. : 10/422227
DATED : December 8, 2009
INVENTOR(S) : Stamler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1113 days.

Signed and Sealed this

Twenty-first Day of December, 2010

David J. Kappos
*Director of the United States Patent and Trademark Office*